United States Patent
Williams et al.

(10) Patent No.: US 9,653,066 B2
(45) Date of Patent: May 16, 2017

(54) SYSTEM AND METHOD FOR ESTIMATING THE RELIABILITY OF ALTERNATE SPEECH RECOGNITION HYPOTHESES IN REAL TIME

(75) Inventors: Jason Williams, New York, NY (US); Suhrid Balakrishnan, Westfield, NJ (US)

(73) Assignee: Nuance Communications, Inc., Burlington, MA (US)

( * ) Notice: Subject to any disclaimer, the term of this patent is extended or adjusted under 35 U.S.C. 154(b) by 1455 days.

(21) Appl. No.: 12/604,650

(22) Filed: Oct. 23, 2009

(65) Prior Publication Data

US 2011/0099012 A1     Apr. 28, 2011

(51) Int. Cl.
  *G10L 15/01*     (2013.01)
  *G10L 15/08*     (2006.01)

(52) U.S. Cl.
  CPC .............. *G10L 15/01* (2013.01); *G10L 15/08* (2013.01)

(58) Field of Classification Search
  CPC .......... G10L 15/08; G10L 15/22; G10L 15/30
  USPC .................. 704/275, 240, 236, 255
  See application file for complete search history.

(56) References Cited

U.S. PATENT DOCUMENTS

| | | | | |
|---|---|---|---|---|
| 7,277,850 B1* | 10/2007 | Hakkani-Tur | ........ | G10L 15/083 704/232 |
| 7,379,870 B1* | 5/2008 | Belvin | ..................... | G10L 15/18 704/255 |
| 2002/0135618 A1* | 9/2002 | Maes | ..................... | G06F 3/0481 715/767 |
| 2004/0034518 A1* | 2/2004 | Rose | ........................ | G10L 15/26 704/1 |
| 2004/0122674 A1* | 6/2004 | Bangalore | ............... | G10L 15/26 704/276 |
| 2007/0208567 A1* | 9/2007 | Amento | ................... | G10L 15/22 704/270 |
| 2007/0239445 A1* | 10/2007 | Kobal et al. | ................... | 704/235 |
| 2008/0154600 A1* | 6/2008 | Tian | ....................... | G10L 15/083 704/251 |

(Continued)

OTHER PUBLICATIONS

Sibel Yaman et al., "An Integrative and Discriminative Technique for Spoken Utterance Classification", Aug. 2008, pp. 1-8.*

(Continued)

*Primary Examiner* — Douglas Godbold
*Assistant Examiner* — Mark Villena

(57) ABSTRACT

Disclosed herein are systems, methods, and computer-readable storage media for estimating reliability of alternate speech recognition hypotheses. A system configured to practice the method receives an N-best list of speech recognition hypotheses and features describing the N-best list, determines a first probability of correctness for each hypothesis in the N-best list based on the received features, determines a second probability that the N-best list does not contain a correct hypothesis, and uses the first probability and the second probability in a spoken dialog. The features can describe properties of at least one of a lattice, a word confusion network, and a garbage model. In one aspect, the N-best lists are not reordered according to reranking scores. The determination of the first probability of correctness can include a first stage of training a probabilistic model and a second stage of distributing mass over items in a tail of the N-best list.

20 Claims, 3 Drawing Sheets

(56) References Cited

U.S. PATENT DOCUMENTS

| | | | |
|---|---|---|---|
| 2008/0189106 A1* | 8/2008 | Low | G01C 21/3608 |
| | | | 704/231 |
| 2009/0187407 A1* | 7/2009 | Soble | G06F 19/3487 |
| | | | 704/260 |
| 2010/0145694 A1* | 6/2010 | Ju | G10L 15/1815 |
| | | | 704/235 |

OTHER PUBLICATIONS

Jason Williams, "Exploiting the ASR N-Best by Tracking Multiple Dialog State Hypotheses", Sep. 22-26, 2008 Interspeech 2008.*

V. Goffin et al. "The AT&T Watson Speech Recognizer", ICASSP 2005, pp. I-1033-I-1036.

John C. Platt "Probabilistic Outputs for Support Vector Machines and Comparisons to Regularized Likelihood Methods", Mar. 26, 1999, 11 pages.

Jason D. Williams et al. "Partially Observable Murkov Decision Processes For Spoken Dialog Systems", Computer Speech and Language 21 (2007) pp. 393-422.

Jason D. Williams "Exploiting the ASR N-Best by Tracking Multiple Dialog State Hypothesis", AT&T Labs—Research, Shannon Laboratory, 180 Park Ave., Florham Park, NJ 07932, USA, 4 pages, Sep. 22-26, 2008.

Steve Young et al, "The Hidden Information State Model: A Practical Framework for POMDP-Based Spoked Dialogue Management", Cambridge University Engineering Department, Trumpington Street, Cambridge, CN2 1PZ, UK, 37 pages, Feb. 5, 2009.

* cited by examiner

PROBABILITY THAT THE
CORRECT HYPOTHESIS IS NOT — 412
ON THE LIST - 11%

A system configured to practice the method receives an N-best list of speech recognition hypotheses and features describing the N-best list, determines a first probability of correctness for each hypothesis in the N-best list based on the received features, determines a second probability that the N-best list does not contain a correct hypothesis, and uses the first probability and the second probability in a spoken dialog. The features can describe properties of at least one of a lattice, a word confusion network, and a garbage model. In one aspect, the N-best lists are not reordered according to reranking scores. The determination of the first probability of correctness can include a first stage of training a discriminative model and a second stage of distributing mass over items in a tail of the N-best list.

SYSTEM AND METHOD FOR ESTIMATING THE RELIABILITY OF ALTERNATE SPEECH RECOGNITION HYPOTHESES IN REAL TIME

BACKGROUND

1. Technical Field

The present disclosure relates to automatic speech recognition (ASR) and more specifically to estimating correctness in ASR N-Best lists.

2. Introduction

Despite years of research, ASR technology is far from perfect and recognition errors are common, especially in uncontrolled environments. Spoken dialog systems rely on speech recognition for input from users, and recognition errors lead to misunderstandings that lengthen conversations, reduce task completion, and decrease customer satisfaction. To help identify errors, speech recognizers output confidence scores. Confidence scores indicate the reliability of the top hypothesis. When the confidence score is high, the ASR system can assume that the top hypothesis in an N-best list of hypotheses is more reliable. However, confidence scores have three intrinsic problems. First, it is difficult to set a good threshold for when to accept or reject a speech recognition result because the score itself doesn't have a clearly defined meaning. For example, a score of 50 on one grammar might indicate high reliability, but a score of 50 on another grammar might indicate very low reliability. Setting the threshold requires a trial-and-error process of carefully tuning each grammar. The second problem is that confidence scores are typically based on a limited set of features. These features typically include various measures of how well the audio in the speech matches the acoustic and language models. However current ASR systems and ways of generating confidence scores ignore a number of other potentially useful features.

Further, ASR systems assign a confidence score probability only to the most likely recognition hypothesis, yet the speech recognition engine yields many speech recognition hypotheses, perhaps 100 or more, in a list called the N-Best list. When the top hypothesis is not correct, the N-Best list often contains the correct answer further down, yet the confidence score does not communicate anything about the reliability of the items on the N-Best list.

ASR systems can output a related measurement called a word confusion network (WCN). A WCN assigns probabilities to alternate word hypotheses based on how well the word and its audio match the language and acoustic models. WCNs can assign probabilities to each item in the N-Best list. However, WCNs have two important limitations. First, WCNs do not explicitly account for the probability that the correct answer is nowhere on the list. Second, as with a confidence score, WCNs are based on a limited set of features.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and computer-readable storage media for estimating a probability of correctness for N-Best lists. While many examples herein discuss N-Best lists in the context of speech recognition, the principles herein can also apply to non-speech applications, such as handwriting or gesture recognition, in which case the received hypotheses are not speech based. A system configured to practice the method receives an N-best list of speech recognition hypotheses and features describing the N-best list, determines a first probability of correctness for each hypothesis in the N-best list based on the received features, determines a second probability that the N-best list does not contain a correct hypothesis, and uses the first probability and the second probability in a spoken dialog. The features can describe properties of at least one of a lattice, a word confusion network, and a garbage model. In one aspect, the N-best lists are not reordered according to reranking scores. The determination of the first probability of correctness can include a first stage of training a discriminative model and a second stage of distributing mass over items in a tail of the N-best list.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
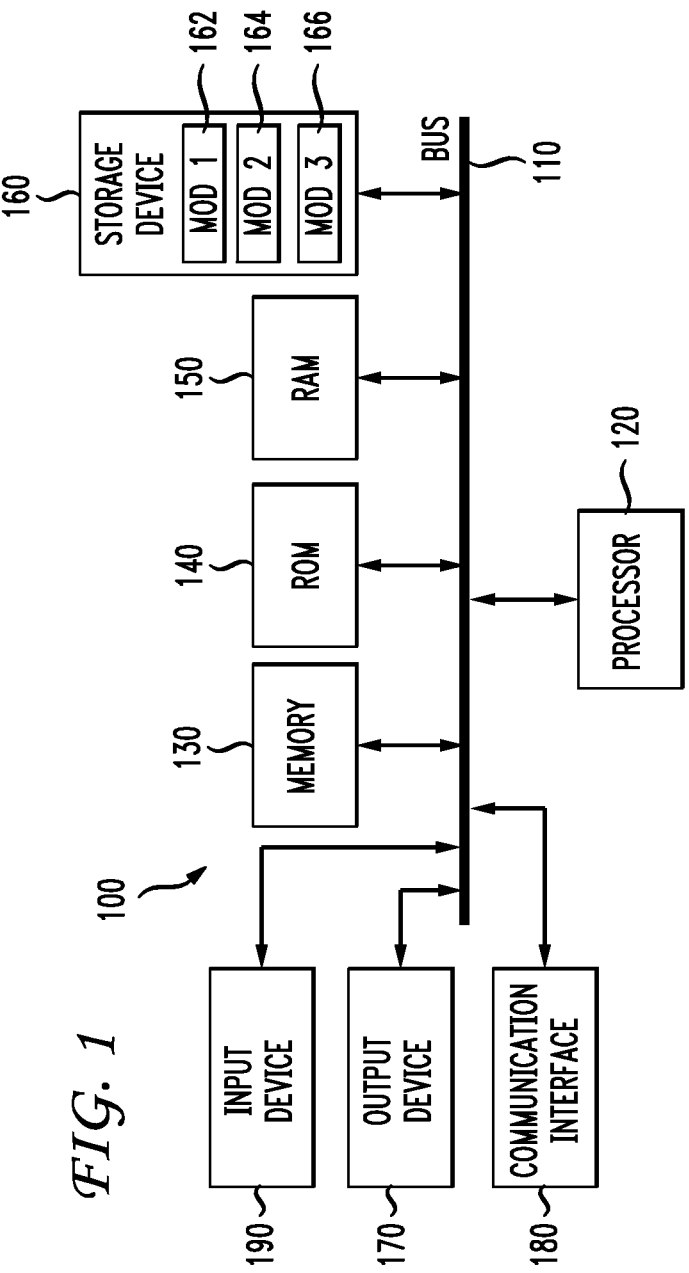
FIG. 1 illustrates an example system embodiment.

Disclosed herein is a method for estimating the reliability of alternate recognition hypotheses output by a speech recognizer. When speech recognizers process audio, they output an N-Best list of speech recognition hypotheses, the first item in the N-Best list being the most likely. In addition, speech recognizers also output several measures of confidence in the items. However, these existing measures of confidence have several substantial weaknesses as set forth in the background section which effectively constrain spoken dialog systems to using only the top recognition hypothesis. When the top recognition hypothesis is incorrect, the N-Best list often contains the correct answer further down. Without a better measure of the reliability of items on the N-Best list, dialog systems throw away all the useful information on the N-Best list except the first item.

This disclosure overcomes this limitation. Specifically, a speech recognizer takes as input many features about the N-Best list and recognition process, and outputs a probability of correctness for each item on the N-Best list, and the probability that the correct item does not appear anywhere on the list. Features can include the number of alternate recognition hypotheses, the number of words recognized, the duration of the speech, etc. Taken together, all of these provide additional clues about whether the recognition is correct. When applied to traditional dialog systems, this approach increases task completion and user satisfaction by enabling better decisions about whether output from the speech recognizer is correct. For sophisticated dialog systems which track many hypotheses for the current dialog state, this method yields fewer whole-dialog understanding errors. For example, in a business search application such as 411 directory assistance, this approach substantially improves the ranking of search results, so users more often and more quickly find what they are searching for.

This disclosure formalizes this task as a regression problem. In other words, rather than relying on heuristics, this approach learns a model to assign probabilities given many examples of correct and incorrect recognitions. Specifically, this invention computes P(n|F) where n is the location of the correct match and F is a set of features. A special value n=* indicates that the correct answer is not on the N-Best list. The set of features in F is arbitrary, and may include any features about the recognition, including elements in a confidence score such as acoustic scores as well as extrinsic elements like the number of items in the N-Best list, whether problematic words appear in the N-Best list, etc.

This approach decomposes P into two elements, $P_a$ and $P_b$, and computes $P=P_a \times P_b$. $P_a$ computes the probability that the correct answer is in the n=1 position, somewhere else on the list (n=2+), or not on the list (n=*). For the $P_a(n=2+|F)$ case, $P_b$ distributes mass among the elements in 2,&,N. If n=1 or n=*, $P_b=1$ and thus has no effect. To compute $P_a$ this approach learns a probability distribution using multinomial logistic regression (MLR). MLR is an established technique in the statistical modeling literature. It learns the assignment of probabilities to a fixed number of classes from training data using features. One could use other techniques such as probabilistic versions of multi-class support vector machines (SVMs), however MLRs can sometimes compute better probabilities than probabilistic versions of multi-class SVMs.

Computing $P_b$ is difficult because the number of classes which are assigned probabilities varies. One recognition result might contain 10 hypotheses and another might contain as many as 100. Fortunately, the distribution of fractional depth of matches (n/N) in experimental data was relatively constant over many values of N. For example, for both short (N<50) and long lists (N>50), the probability that the answer was in the top half of the list was very similar. The distribution of the fractional depths of correct matches closely fit a Beta distribution on experimental data. From this fit Beta distribution, this approach obtains the N−1 probabilities that comprise $P_b$ by sub-dividing the continuous [0, 1] interval into N−1 evenly spaced discrete "buckets." Each bucket corresponds to its appropriate fractional position. The approach includes obtaining the probability mass in any bucket by calculating the cumulative Beta probability corresponding to that fractional position. The mass of the first bucket is $P_b(n=2)$, the mass of the second bucket is $P_b(n=3)$, and so on.

This model is an improvement over all alternative techniques. Unlike confidence scores, this approach outputs meaningful numbers. Probabilities are frequencies, so a probability of 0.7 has the same meaning on any grammar. Also, unlike confidence scores, this approach computes the reliability of items on the N-Best list. Unlike word confusion networks, this approach assigns a probability to the possibility that the correct answer is not anywhere on the list. Unlike both methods, this approach can use arbitrary features, and as a result estimate better probabilities. This approach assigns probabilities to all of the items in an N-Best list, and also computes the probability that none of the entries on the N-Best list is correct.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. These and other modules can be configured to control the processor 120 to perform various actions. Other system memory 130 may be available for use as well. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a tangible and/or intangible computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Computer-readable storage media expressly exclude media such as energy, carrier signals, electromagnetic waves, and signals per se, which are classified as computer-readable transmission media.

To enable user interaction with the computing device 100, an input device 190 represents any number of input mechanisms, such as a microphone for speech, a touch-sensitive screen for gesture or graphical input, keyboard, mouse, motion input, speech and so forth. The input device 190 may be used by the presenter to indicate the beginning of a speech search query. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Generally speaking, such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
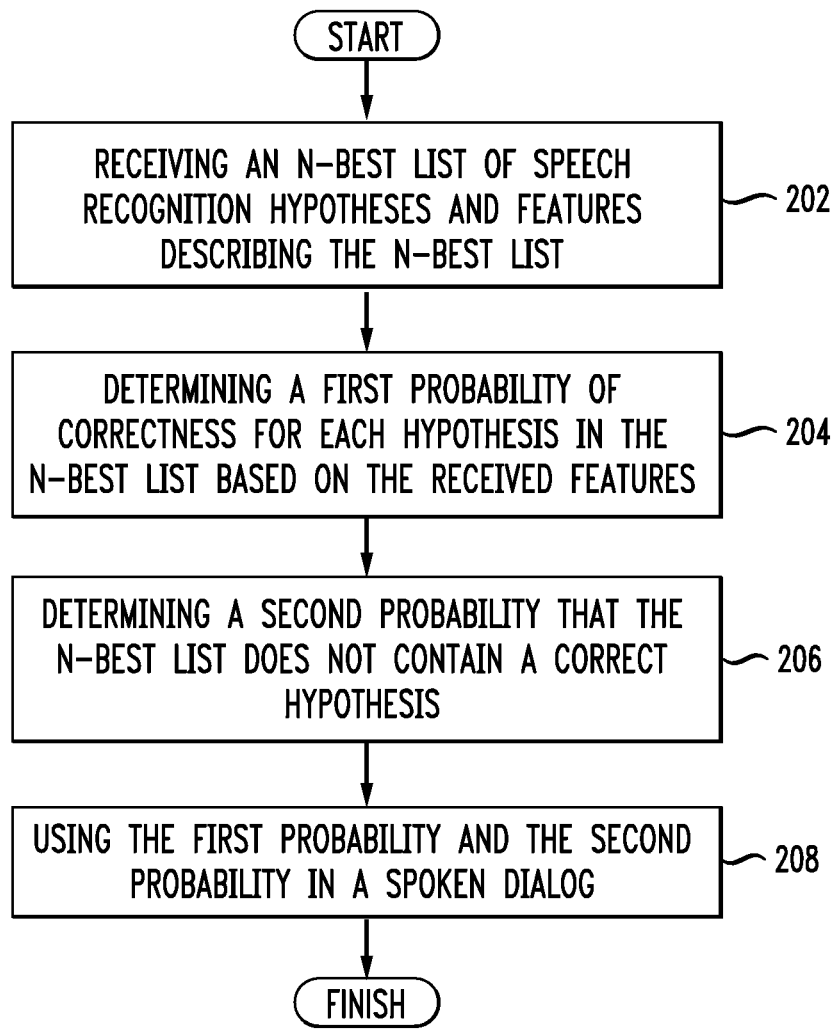
FIG. 2 illustrates an example method embodiment.

Having disclosed some basic system components, the disclosure now turns to the exemplary method embodiment shown in FIG. 2. For the sake of clarity, the method is discussed in terms of an exemplary system such as is shown in FIG. 1 configured to practice the method.

FIG. 2 illustrates an example method embodiment for estimating a probability of correctness for N-Best lists. A system, such as the system 100 of FIG. 1, configured to practice the method receives an N-best list of speech recognition hypotheses and features describing the N-best list (202), determines a first probability of correctness for each hypothesis in the N-best list based on the received features (204), determines a second probability that the N-best list does not contain a correct hypothesis (206), and uses the first probability and the second probability in a spoken dialog (208). The features can describe properties of at least one of a lattice, a word confusion network, and a garbage model. In one aspect, the N-best lists are not reordered according to reranking scores. The determination of the first probability of correctness can include a first stage of training a discriminative model and a second stage of distributing mass over items in a tail of the N-best list.

Figure 3:
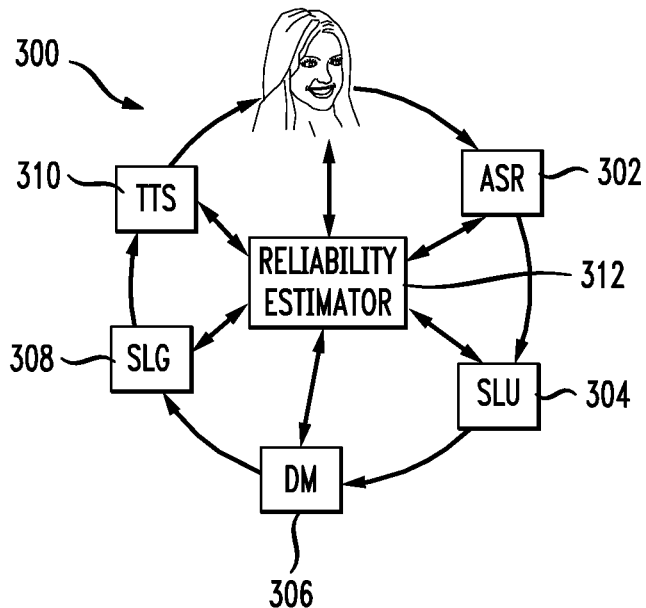
FIG. 3 illustrates a schematic block diagram illustrating one embodiment of a system for automatic speech recognition.

FIG. 3 illustrates a schematic block diagram illustrating one embodiment of a system for automatic speech recognition. FIG. 3 is a functional block diagram that illustrates an exemplary natural language spoken dialog system. Spoken dialog systems aim to identify intents of humans, expressed in natural language, and take actions accordingly, to satisfy their requests. Natural language spoken dialog system 300 can include an automatic speech recognition (ASR) module 302, a spoken language understanding (SLU) module 304, a dialog management (DM) module 306, a spoken language generation (SLG) module 308, and synthesizing module 310. The synthesizing module can be any type of speech output module. For example, it can be a module wherein one prerecorded speech segment is selected and played to a user. Thus, the synthesizing module represents any type of speech output. The present disclosure focuses on innovations related to the ASR module 302 and can also relate to other components of the dialog system.

The ASR module 302 analyzes speech input and provides a textual transcription of the speech input as output. SLU module 204 can receive the transcribed input and can use a natural language understanding model to analyze the group of words that are included in the transcribed input to derive a meaning from the input. The role of the DM module 306 is to interact in a natural way and help the user to achieve the task that the system is designed to support. The DM module 306 receives the meaning of the speech input from the SLU module 304 and determines an action, such as, for example, providing a response, based on the input. The SLG module 308 generates a transcription of one or more words in response to the action provided by the DM 306. The synthesizing module 310 receives the transcription as input and provides generated audible speech as output based on the transcribed speech.

Thus, the modules of system 300 recognize speech input, such as speech utterances, transcribe the speech input, identify (or understand) the meaning of the transcribed speech, determine an appropriate response to the speech input, generate text of the appropriate response and from that text, generate audible "speech" from system 300, which the user then hears. In this manner, the user can carry on a natural language dialog with system 300. Those of ordinary skill in the art will understand the programming languages for generating and training ASR module 302 or any of the other modules in the spoken dialog system. Further, the modules of system 300 can operate independent of a full dialog system. For example, a computing device such as a smartphone (or any processing device having a phone capability) can include an ASR module wherein a user says "call mom" and the smartphone acts on the instruction without a "spoken dialog." A module for automatically transcribing user speech can join the system at any point or at multiple points in the cycle or can be integrated with any of the modules shown in FIG. 3. The reliability estimator 312 can interface with all the other components of the system 300 in order to receive dialog features or to transmit probabilities. For example, the reliability estimator 312 can receive speech features from the ASR unit 302, calculate probabilities for entries in an N-Best list and transmit all or part of the probabilities and/or N-Best list to the dialog manager 306 for use in managing the dialog.

Figure 4:
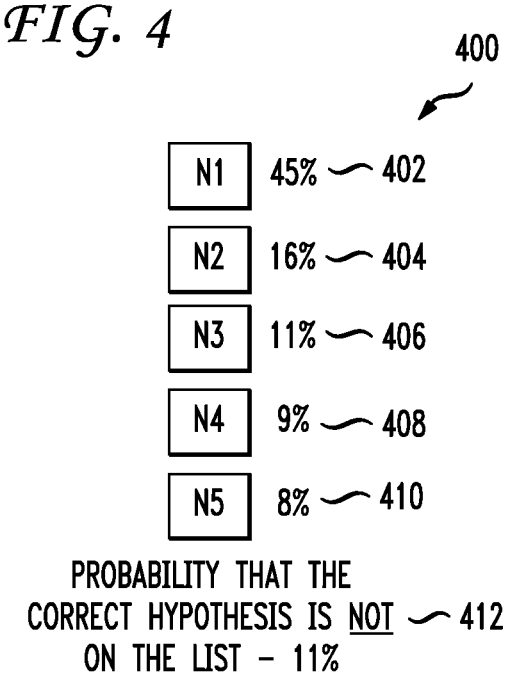
FIG. 4 illustrates an example N-Best List with confidences and a probability that the correct item is not on the list.

FIG. 4 illustrates an example N-Best list 400 with probabilities of correctness and a probability that the correct item is not on the list. For example, N1 402 has a 45% probability of correctness that it is the correct answer. N2 404 has a 16% probability of correctness, N3 406 has an 11% probability of correctness, N4 408 has a 9% probability of correctness, and N5 410 has an 8% probability of correctness. Recognition probabilities of correctness in an N-Best list are typically sorted such that the entries with the highest probability of correctness occur at the top and the entries with the lowest probability of correctness occur at the bottom. Also illustrated in this example is a probability that the correct hypothesis is not in the N-Best list 412. In this example, that probability is 11%. The items on in the N-Best list are mutually exclusive, so the probabilities should sum to 1 or 100%.

One benefit of this approach is that it enables the creation of dialog systems which yield higher task completion rates and engage in faster, more intelligent dialogs. In its simplest application, this technique can better identify errors than traditional confidence scores. In more sophisticated applications, this approach allows a recognizer to not only detect an error, but to fix it. This ability is best described via an example. Suppose a caller from Cambridge, Mass., says 'I want a flight from Boston' and the recognizer's first guess is 'AUSTIN' and the second guess is 'BOSTON'. If 'BOSTON' is nearly as reliable as 'AUSTIN', it is better to trust 'BOSTON', since the caller likely wants to leave from their closest airport. However, if 'BOSTON' is substantially less reliable than 'AUSTIN', then it better to trust 'AUSTIN'. In order to decide exactly how much trust to place in each of the elements, the dialog system needs to know the probability that each of them is correct, which is what this approach computes.

Conveniently, this technique simply makes better use of existing information, and can be installed without making changes to the user interface. From the user's perspective, the same user interface simply makes fewer errors. The expense to the dialog system operator is a marginal increase in computation. This technology can be applied in at least two ways. First, this approach can increase the automation rate of existing speech recognition services. Second, this approach can create new services which would be difficult to implement using conventional techniques, such as a speech-enabled yellowpages.com. Moreover, this technique can increase user satisfaction. For telephone based dialog systems, the primary driver of user satisfaction is whether the user perceives that the system understands the user. This invention tackles this problem directly, increasing how often the system understands the user correctly.

Embodiments within the scope of the present disclosure may also include tangible computer-readable storage media for carrying or having computer-executable instructions or data structures stored thereon. Such computer-readable storage media can be any available media that can be accessed by a general purpose or special purpose computer, including the functional design of any special purpose processor as discussed above. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can be applied to handwriting recognition as well as speech recognition or to any other suitable situation including N-best lists. Those skilled in the art will readily recognize various modifications and changes that may be made to the principles described herein without following the example embodiments and applications illustrated and described herein, and without departing from the spirit and scope of the disclosure.

We claim:

1. A method comprising:
receiving an N-best list of speech recognition hypotheses from a speech utterance, wherein the N-best list of speech recognition hypotheses comprises words recognized from the speech utterance;
receiving an acoustic score of each word in the N-best list of speech recognition hypotheses;
receiving a count indicating a number of words associated with each hypothesis in the speech recognition hypotheses;
receiving an indication of problematic words in the each hypothesis in the N-best list of speech recognition hypotheses, wherein the indication is determined by a reliability estimator;
determining, via a processor and based on a feature set evaluated by an algorithm, a first probability of correctness for the each hypothesis in the N-best list of speech recognition hypotheses, the feature set evaluated by the algorithm comprising the count, the acoustic score, and the indication of problematic words;
determining, via the processor, a second probability that the N-best list of speech recognition hypotheses does not contain a correct hypothesis using the reliability estimator; and
using the first probability and the second probability in a spoken dialog.

2. The method of claim 1, wherein the speech recognition hypotheses are stored in a word confusion network.

3. The method of claim 1, wherein the processor is configured to perform speech language generation.

4. The method of claim 1, wherein determining the first probability of correctness comprises two stages.

5. The method of claim 4, wherein a first stage of the two stages comprises training a discriminative model $P_a$.

6. The method of claim 5, wherein a second stage of the two stages comprises distributing mass over items in a tail of the N-best list.

7. The method of claim 1, wherein the processor is configured to perform spoken language understanding.

8. The method of claim 1, the processor is configured to perform automatic speech recognition, and further comprising using the first probability and the second probability in the automatic speech recognition.

9. A system comprising:
a processor; and
a computer-readable storage medium having instructions stored which, when executed by the processor, result in the processor performing operations comprising:
receiving an N-best list of speech recognition hypotheses from a speech utterance, wherein the N-best list of speech recognition hypotheses comprises words recognized from the speech utterance;
receiving an acoustic score of each word in the N-best list of speech recognition hypotheses;
receiving a count indicating a number of words associated with each hypothesis in the speech recognition hypotheses;
receiving an indication of problematic words in the each hypothesis in the N-best list of speech recognition hypotheses, wherein the indication is determined by a reliability estimator;
determining, based on a feature set evaluated by an algorithm, a first probability of correctness for the each hypothesis in the N-best list of speech recognition hypotheses, the feature set evaluated by the algorithm comprising the count, the acoustic score, and the indication of problematic words;
determining a second probability that the N-best list of speech recognition hypotheses does not contain a correct hypothesis using the reliability estimator; and
using the first probability and the second probability in a spoken dialog.

10. The system of claim 9, wherein the speech recognition hypotheses are stored in a garbage model.

11. The system of claim 9, wherein the processor is configured to perform speech language generation.

12. The system of claim 9, wherein determining the first probability of correctness comprises two stages.

13. The system of claim 12, wherein a first stage of the two stages comprises training a discriminative model $P_a$.

14. The system of claim 13, wherein a second stage of the two stages comprises distributing mass over items in a tail of the N-best list.

15. A computer-readable storage medium having instructions stored which, when executed by a computing device, cause the computing device perform operations comprising:
receiving an N-best list of speech recognition hypotheses from a speech utterance, wherein the N-best list of speech recognition hypotheses comprises words recognized from the speech utterance;
receiving an acoustic score of each word in the N-best list of speech recognition hypotheses;
receiving a count indicating a number of words associated with each hypothesis in the speech recognition hypotheses;
receiving an indication of problematic words in the each hypothesis in the N-best list of speech recognition hypotheses, wherein the indication is determined by a reliability estimator;
determining, based on a feature set evaluated by an algorithm, a first probability of correctness for the each hypothesis in the N-best list of speech recognition hypotheses, the feature set evaluated by the algorithm comprising the count, the acoustic score, and the indication of problematic words;
determining a second probability that the N-best list of speech recognition hypotheses does not contain a correct hypothesis using the reliability estimator; and
using the first probability and the second probability in a spoken dialog.

16. The computer-readable storage medium of claim 15, wherein the speech recognition hypotheses are stored in one of a word confusion network and a garbage model.

17. The computer-readable storage medium of claim 15, wherein the computing device is configured to perform speech language generation.

18. The computer-readable storage medium of claim 15, wherein determining the first probability of correctness comprises two stages.

19. The computer-readable storage medium of claim 18, wherein a first stage of the two stages comprises training a discriminative model $P_a$.

20. The computer-readable storage medium of claim 19, wherein a second stage of the two stages comprises distributing mass over items in a tail of the N-best list.

* * * * *